United States Patent [19]

Sutera et al.

[11] Patent Number: 4,573,057

[45] Date of Patent: Feb. 25, 1986

[54] CONTINUOUS INK JET AUXILIARY DROPLET CATCHER AND METHOD

[75] Inventors: Richard Sutera, Centerville; Roger C. Burchett, Miamisburg; Janet L. Dukes, Dayton, all of Ohio

[73] Assignee: Burlington Industries, Inc., Greensboro, N.C.

[21] Appl. No.: 708,056

[22] Filed: Mar. 4, 1985

[51] Int. Cl.$^4$ .............................................. G01D 15/18

[52] U.S. Cl. ........................................ 346/1.1; 346/75

[58] Field of Search .................................. 346/75, 1.1

[56] References Cited

U.S. PATENT DOCUMENTS

| | | | |
|---|---|---|---|
| 3,373,437 | 3/1968 | Sweet et al. | 346/75 |
| 3,560,988 | 2/1971 | Krick | 346/1.1 |
| 3,579,721 | 5/1971 | Kaltenbach | 425/3 |
| 3,596,275 | 7/1971 | Sweet | 346/1.1 |
| 4,119,973 | 10/1978 | Stager | 346/75 |
| 4,150,384 | 4/1979 | Meece | 346/75 |
| 4,160,982 | 7/1979 | Keur | 346/75 |
| 4,199,767 | 4/1980 | Campbell et al. | 346/75 |
| 4,217,594 | 8/1980 | Meece et al. | 346/75 |
| 4,266,231 | 5/1981 | Drago et al. | 346/75 |
| 4,305,079 | 12/1981 | Mix, Jr. | 346/75 |
| 4,367,479 | 1/1983 | Bower | 346/140 R |
| 4,371,881 | 2/1983 | Bork et al. | 346/140 R |
| 4,413,265 | 11/1983 | Kockler et al. | 346/1.1 |
| 4,439,776 | 3/1984 | Zeiler | 346/75 |
| 4,514,735 | 4/1985 | Jones | 346/1.1 |

*Primary Examiner*—E. A. Goldberg
*Assistant Examiner*—Gerald E. Preston
*Attorney, Agent, or Firm*—Cushman, Darby & Cushman

[57] ABSTRACT

An auxiliary droplet catcher and a method for its use in an ink jet printing apparatus of the type having charge and deflection electrodes to respectively charge selected droplets and then deflect the selected charge droplets from a normal droplet flight path towards a primary droplet catching structure. The auxiliary droplet catcher is mounted for reciprocal movements between retracted and advanced positions and is moved into the advanced position in response to a control system sensing an inability of the charge and/or deflection electrodes to respectively charge and/or deflect the selected droplets, thereby preventing flooding of a print medium.

26 Claims, 6 Drawing Figures

CONTINUOUS INK JET AUXILIARY DROPLET CATCHER AND METHOD

FIELD OF THE INVENTION

The present invention generally relates to noncontact fluid printing devices conventionally known as "ink jet" or "fluid jet" printers. More particularly, the present invention is related to an auxiliary droplet catching structure which is movable between retracted and advanced positions so as to prevent flooding of a print substrate in response to a sensed inability of the charging and/or deflection electrodes to effectively charge and/or deflect fluid droplets, respectively.

BACKGROUND AND SUMMARY OF THE INVENTION

Noncontact printers which utilize charged droplets are generally known as evidenced by U.S. Pat. Nos. 3,373,437 to Sweet et al; 3,560,988 to Crick; 3,579,721 to Kaltenbach; and 3,596,275 to Sweet. Typically, fluid filaments of e.g. ink, dye, etc. are issued through respective orifices of an orifice plate. An array of individually controllable electrostatic charging electrodes is disposed downstream of the orifice plate along the so-called "droplet formation zone." In accordance with known principles of electrostatic induction, the fluid filament is caused to assume an electrical potential opposite in polarity and related in magnitude to the electrical potential of its respective charging electrode. When a droplet of fluid is separated from the filament, this induced electrostatic charge is trapped on and in the droplet. Thus, subsequent passage of the charged droplet through an electrostatic field having the same polarity as the droplet charge will cause the droplet to be deflected away from a normal droplet path towards a droplet catching structure. Uncharged droplets, on the other hand, proceed along the normal path and are eventually deposited upon a receiving substrate.

A problem arises, however, in that should the charging and/or deflection electrode become inoperative due to, for example, loss or interruption of electrical power or shorting of the electrodes to ground potential, it would become impossible to electrostatically charge the droplets and/or to thereafter deflect the charged droplets from the normal droplet flight-path. That is, should either the charging electrode or deflection electrode malfunction, substantially all of the droplets may behave similarly to uncharged droplets and will thus proceed along the normal droplet flight path and be deposited upon the print medium. There exists therefore the possibility that the print medium will become flooded due to the inability of the charging electrode and/or deflection electrode to perform their intended functions. As higher printing speeds are used, great waste of fluid and substrate material can occur as the result of electrode failure over even short intervals of time.

Often, the charge and/or deflection electrodes of an ink jet printer can become electrically shorted to ground potential during the course of normal printing operations as a result of electrical bridging via particulate impurities in the printing fluid and even via the fluid itself. The distance between charging electrodes and fluid filaments is typically very small (on the order of thousandths of an inch) to ensure proper electrostatic charge induction. Consequently, charge electrodes may sometimes become wetted with a quantity of printing fluid. Printing fluid typically has sufficient electrical conductivity to cause current to flow from the wetted charge electrode to any other structure also in contact with the quantity of fluid, thereby decreasing the charging potential of the wetted charge electrode. Small particles in the fluid which become lodged between a charge electrode and a structure at ground potential (such as an electrode mounting fixture, etc.) can completely short the charging electrode to ground potential.

Shorting of charging and/or deflection electrodes can usually be easily cured by simply drying and/or cleaning the shorted electrode (e.g. by using suction). Unfortunately, the method usually used to detect electrode shorts is for an operator to visually monitor the final printed substrate. An inattentive operator can thus cause extreme waste of printing substrate and printing fluid. Moreover, less-than-catastrophic malfunctions of the electrode can cause printing defects which are not readily discernible to the naked eye as the printing substrate is conveyed past an operator after printing but which should nevertheless be avoided to ensure high quality printing.

The present invention overcomes such disadvantages by providing means by which malfunctions in the charging and/or deflection electrodes are automatically detected. In accordance with one aspect of the invention, droplets in an ink jet printing apparatus are captured to prevent the printing substrate from becoming flooded when the charging and/or deflection electrodes have malfunctioned. The auxiliary droplet catching structure of the present invention is mounted for reciprocal rectilinear movements between a retracted position wherein the catching structure is retracted from the generated droplet streams and an advanced position wherein the catching structure intercepts the droplet streams. In such a manner, the droplet catching structure when in the advanced position prevents the droplet streams from proceeding along the droplet flight path and being deposited upon the print medium.

The movements of the auxiliary catching structure between the retracted and advanced positions are controlled so that the structure operates in a "fail safe" manner. Thus, when the control system senses an inability of the charging and/or deflection electrodes to properly charge and/or deflect droplets, respectively, the auxiliary catch pan will be moved into the advanced position so as to prevent flooding of the substrate due to its interception of substantially all droplets along the normal droplet flight path.

INFORMATION DISCLOSURE STATEMEMT

Attention is directed to the publications discussed below as examples of possibly relevant prior art.

Movable droplet catching structures are, for example, generally known in the art as evidenced by U.S. Pat. No. 4,217,594 to Meece et al; 4,150,384 to Meece; 4,305,079 to Mix, Jr.; 4,371,881 to Bork et al; 4,413,265 to Kockler et al; 4,266,231 to Drago et al; 4,160,982 to Keur; 4,367,479 to Bower; and 4,199,767 to Campbell et al.

Meece '384 and Meece et al '594 disclose a movable gutter 24 that can be moved into a droplet catching position by means of an undisclosed cam when the charging of the droplets is to be synchronized with droplet formation.

Mix, Jr. '079 discloses a primary ink catching gutter that is pivotally movable from its normal operational position at a point spaced from a droplet nozzle along the path of ink droplets to a position immediately adjacent the nozzle plate.

A shield which is movable relative to an ink droplet writing head is disclosed in Bork et al '881. The shield of Bork et al '881 includes a resilient wiper element which, when moved relative to the openings through which ink droplets issue, cleanses the openings. The shield is mounted so as to be pivotally moved from a normal position wherein droplet printing is permitted to a shielding position wherein ink droplets are prevented from striking a printing medium.

Kockler et al '265 also disclose a primary catching device which can be pivoted into a full catch position at start-up and shutdown so as to catch substantially all of the generated droplets. The catching device of Kockler et al '265 is mounted for rotation about an axis parallel to the row of generated ink droplets.

A probe which is movable in a direction along the flight path of ink droplets is disclosed in Drago et al '231. During start-up conditions, the probe is moved to a position adjacent the nozzle plate and is thereafter displaced away from the nozzle plate along the flight path of the ink droplets until the print mode is operational. Once the print mode is operational, a primary droplet catching device catches deflected droplets, the movable probe thus having served its intended function. Upon shutdown of the print mode, the probe is once again moved along the flight path of the ink droplets until the nozzle-adjacent position is reached.

A droplet catching device similar in function to Drago et al '231 is disclosed in Keur '982. Means are disclosed in Keur '982 to move a so-called accumulator, which is normally positioned adjacent the print medium towards the droplet ejection head during shutdown thereof. During start-up, the accumulator is progressively moved in a direction parallel to the generated ink droplet stream until its normal operation position (separated from the ink ejection head) is achieved.

Bower '479 and Campbell et al '767 disclose shutter-type valving mechanisms which reciprocally move so as to either deflect the ink issuing from an ejection nozzle (Bower '479) or sealingly engage with the nozzle to prevent ink from issuing (Campbell et al '767).

As briefly mentioned above, the present invention provides the means by which an inability of the charging and/or deflecting electrodes is sensed and, in response to the sensed inability, an auxiliary droplet catcher is moved into a droplet catching position so as to prevent flooding of a print substrate. These as well as other advantages of the present invention will become better understood by study of the following detailed description of a presently preferred exemplary embodiment of this invention.

BRIEF DESCRIPTION OF THE ACCOMPANYING DRAWINGS

Reference will be hereinafter made to the accompanying drawings wherein like reference numerals throughout the various figures denote like structural elements, and wherein:

FIG. 1 an elevational view of a fluid jet printing apparatus utilizing an auxiliary droplet catcher of the present invention;

FIG. 2 is a plan and diagrammatical view of the auxiliary droplet catcher of FIG. 1;

FIG. 3 a cross-sectional elevational view of the auxiliary droplet catcher taken along line 3—3 in FIG. 2;

FIG. 4 is a block diagram of an exemplary control system for the present invention; and FIGS. 5(A) and 5(B) together represent a flow chart of the steps performed by the control system shown in FIG. 4.

DETAILED DESCRIPTION OF THE PRESENTLY PREFERRED EXEMPLARY EMBODIMENT

Figure 1:
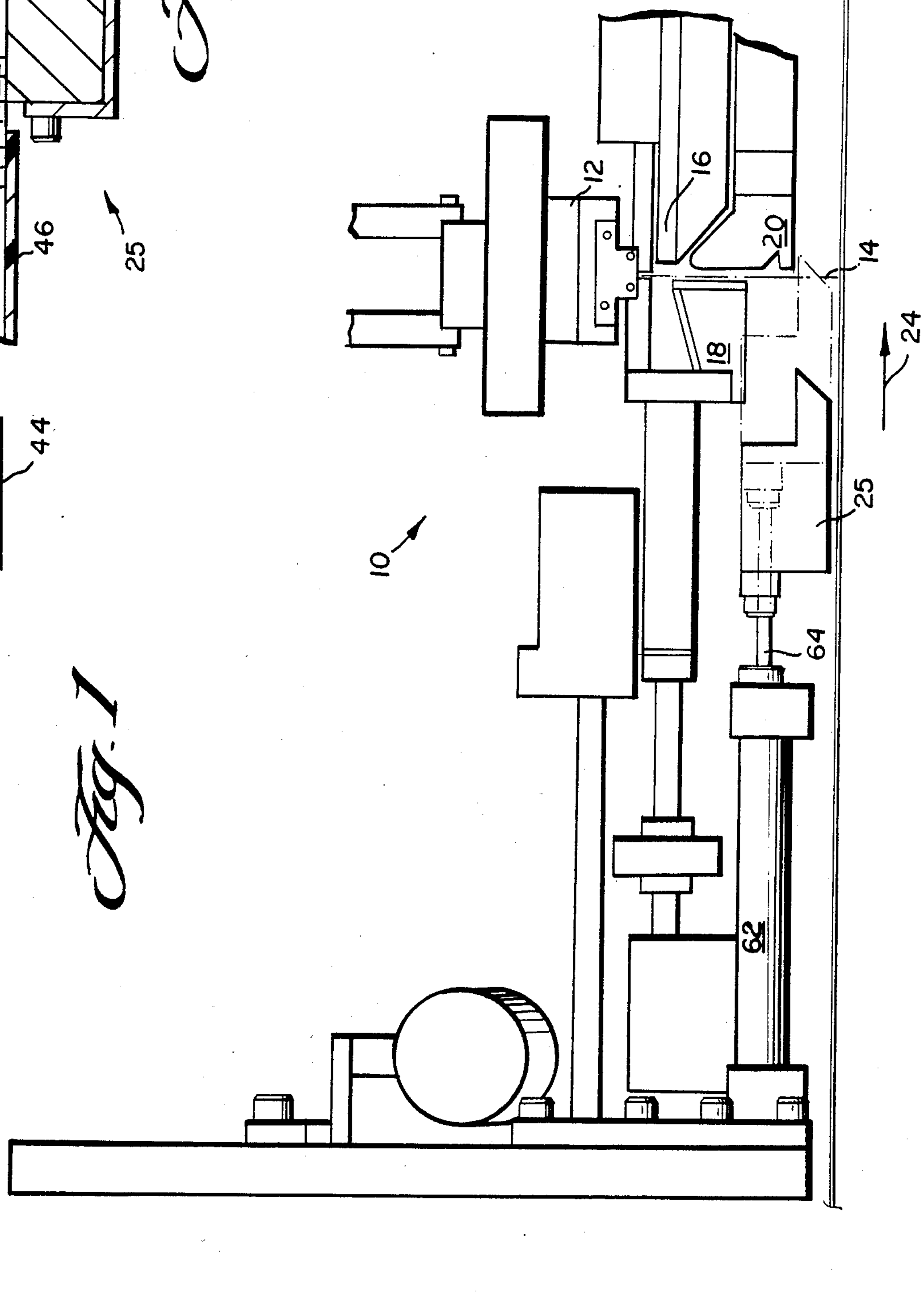

As shown in FIG. 1, the fluid jet apparatus 10 generally includes a printhead 12 having an orifice plate (not shown) through which a linear array of fluid streams are issued so as to generate a sequential plurality of droplets which proceed along a normal droplet flight path 14 toward a print medium 22 moving in the direction indicated by arrow 24. Selected ones of the droplets are charged by means of charge electrode 16 such that when the selected charged droplets pass through a deflection field generated by deflection electrode 18, the charged droplets will be deflected from the normal droplet flight path 14 towards primary droplet catching structure 20. Uncharged droplets, on the other hand, proceed along droplet flight path 14 so as to be deposited upon print medium 22.

Figure 2:
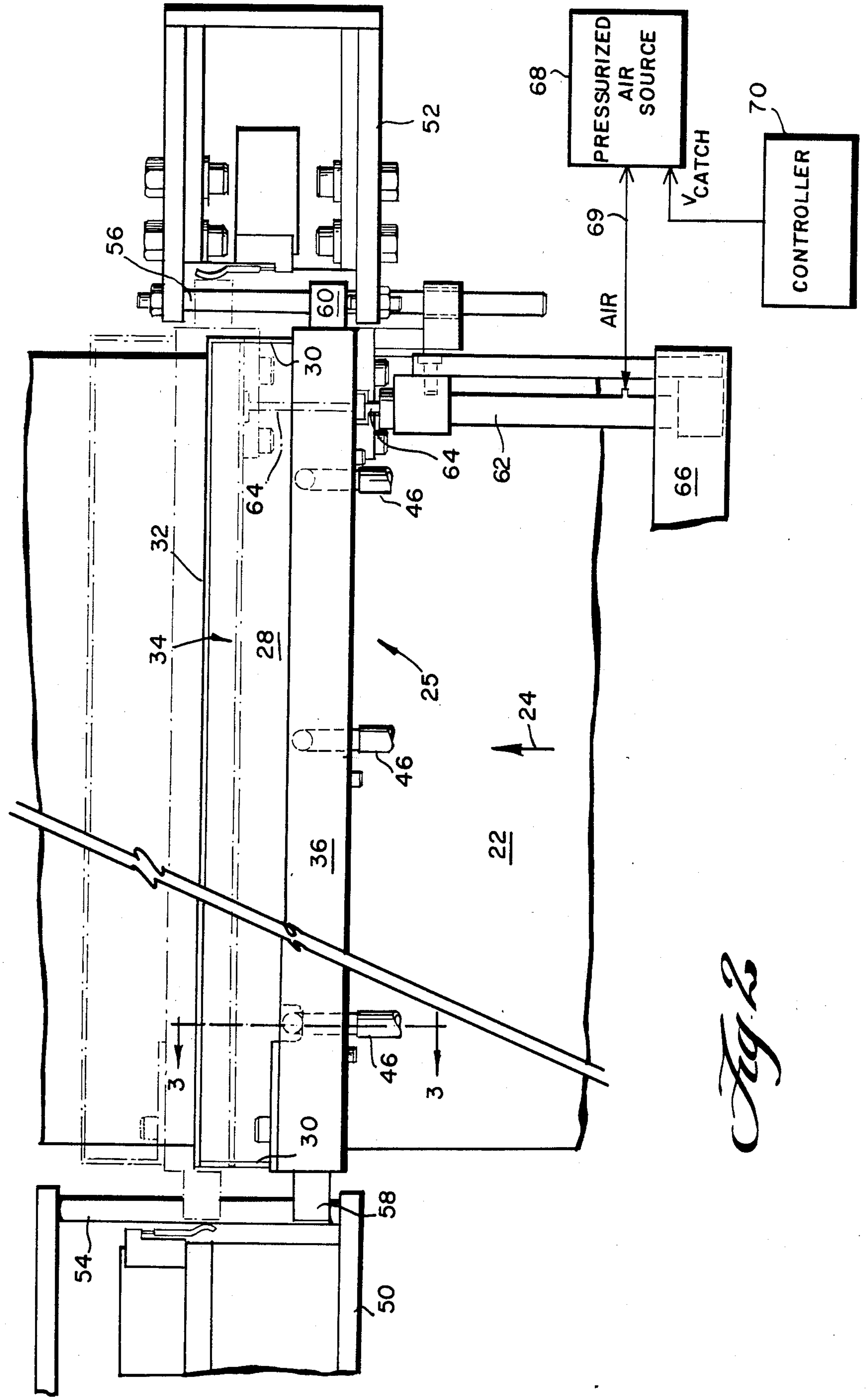

Referring to FIG. 2, the auxiliary droplet catcher 25 is mounted so as to be reciprocally rectilinearly movable along a path substantially perpendicular relative to the normal droplet flight path 14 between a retracted position (shown in solid line in FIGS. 1 and 2) and an advanced or catching position (shown in phantom line in FIGS. 1 and 2).

Figure 3:
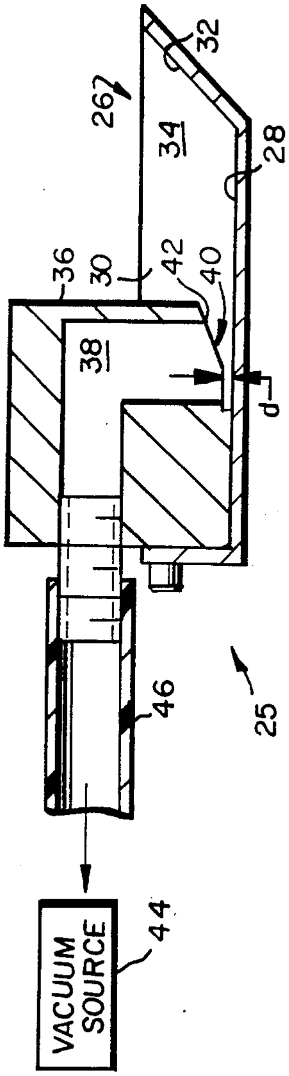

As can be best seen in FIG. 3, the auxiliary droplet catcher 25 includes a tray 26 having a bottom wall 28, opposing side walls 30 and a front wall 32 to thereby define a cavity 34 for accepting fluid. Housing member 36 is fixed to a rear portion of tray 26 and defines a path 38 connected to a vacuum source 44 by means of flexible conduit 46 through which fluid may be removed from the tray. The flexibility of conduit 46 thus enables the auxiliary droplet catcher 25 to be moved between its retracted and advanced positions without interrupting fluid removal through path 38 by means of vacuum source 44.

Tray 26 includes an opening 40 in fluid communication with cavity 34 which is vertically separated from bottom wall 28 by a dimenson "d" to thereby establish the maximum depth of fluid in cavity 34. Opening 40 also preferably includes a beveled edge 42 which assists in maintaining the level of fluid in cavity 34 at a predetermined level. Beveled edge 42 permits the ambient air to be drawn into path 38 by means of vacuum source 44 so as to quickly establish equilibrium flow with the fluid. In such a manner, beveled edge 42 assists in the selection of the maximum depth of fluid in tray 26 in dependence upon the bevel angle of the edge (the angle determining the amount of air drawn into path 38 between the surface of the fluid and beveled edge 42). That is, a greater amount of bevel on edge 42 will cause equilibrium flow with the liquid in tray 26 to be more quickly established and thus greater depth of liquid in tray 26 will be maintained.

As shown in FIG. 2, auxiliary droplet catcher 25 is mounted substantially transversely relative to the movement of print medium 22 (the direction of the movement is indicated by arrow 24) between lateral frames 50, 52 which extend substantially parallel to the direction of movement (arrow 24) of print medium 22. Frames 50, 52 respectively include support 54, 56 rigidly fixed to the frames. Collar members 58, 60 are fixed to the opposing sides of auxiliary droplet catcher 25 and are coupled to support posts 54, 56 so as to permit sliding reciprocal movement of auxiliary droplet catcher 25 between its advanced and retracted positions. An air cylinder 62 or other like actuating means (such as an electromechanical and/or pneumatic actuator) is operatively coupled to auxiliary droplet catcher 25 to provide the actuation force necessary to move auxiliary catcher 25 between its extended and retracted positions. Air cylinder 62 preferably includes an actuator arm 64 which is extendable in response to pressurized air being introduced into cylinder 62.

Pressurized air of a predetermined pressure is selectively produced by a conventional electrically-controlled pressurized air source 68 in response to a control signal $V_{catch}$ produced by an electronic controller 70 (the function and operation of controller 70 will be explained in greater detail in connection with FIGS. 4, 5(A) and 5(B)). Pressurized air produced by pressurized air source 68 is introduced into cylinder 62 via a tube 69. Pressurized air source 68 in the preferred embodiment can be controlled by controller 70 (e.g., by applying a control signal $V_{catch}$ of logic level "1") to introduce pressurized air of a predetermined positive pressure into cylinder 62 to slide auxiliary droplet catcher 25 into its catching position alternatively a predetermined vacuum may be applied to cylinder 62 to move the auxiliary droplet catcher into its retracted position (e.g. by applying a signal $V_{catch}$ of logic level "0"). As will be appreciated, cylinder 62 could instead be a reverse acting air cylinder such that pressurized air is admitted into, or vacuum applied to the cylinder to retract actuator 64, while a spring (not shown) or other biasing means included within air cylinder 62 biases actuator 64 (and thus auxiliary droplet catcher 25) into one of the catching and retracted positions as desired.

Figure 4:
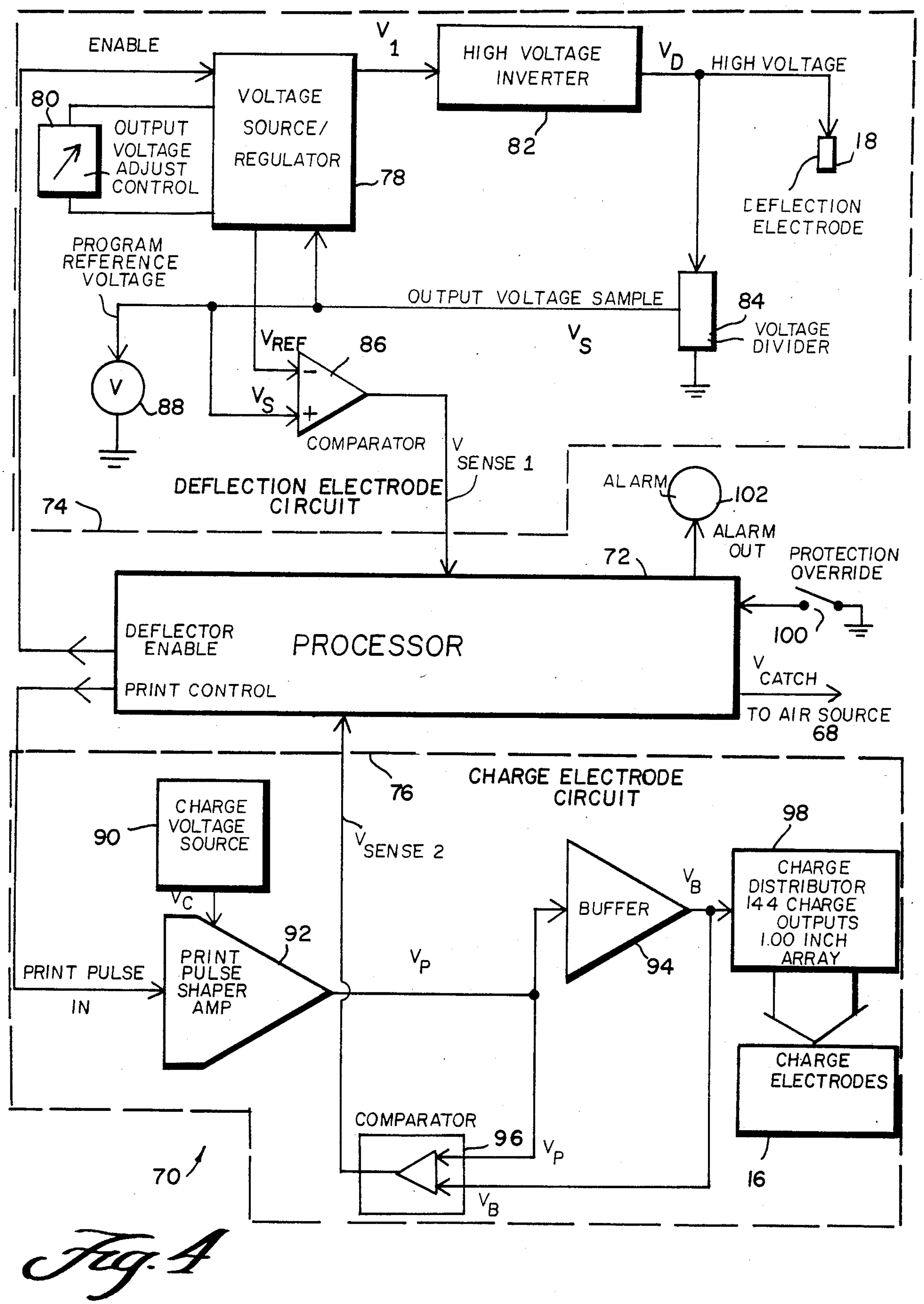

FIG. 4 is a schematic block diagram of a preferred embodiment of electronic controller 70. Controller 70 includes a digital signal processor 72, a deflection electrode circuit 74 and a charge electrode circuit 76.

Deflection electrode circuit 74 selectively applies a predetermined voltage potential to deflection electrode 18 in response to an ENABLE signal produced by processor 72. Deflection electrode circuit 74 applies a signal $V_{sense}$ 1 to processor 72 whenever the potential applied to deflection electrode 18 falls below a predetermined level.

Charge electrode circuit 76 applies a predetermined charging electrical potential to selected ones of an array of charge electrodes 16 in response to a print control signal produced by processor 72 and to appropriate pattern data supplied from a conventional pattern print control circuit (not shown). Charge electrode circuit 76 applies a signal $V_{sense}$ 2 to processor 72 whenever the potential supplied to charge electrodes 16 falls below a predetermined level.

Deflection electrode circuit 74 includes a voltage-source or regulator 78, an output voltage adjust control 80, a high voltage inverter 82, a voltage divider 84, a comparator 86, a voltmeter 88 and, of course, deflection electrode 18. Voltage-source 78 in the preferred embodiment is a conventional regulated DC voltage source which produces an output voltage $V_1$ the level of which can be adjusted by varying output voltage adjust control 80. The output $V_1$ of voltage-source 78 is applied to the input of a conventional high voltage inverter 82. High voltage inverter 82 converts $V_1$ to a high potential voltage $V_D$ having a level proportional to the level of $V_1$, and applies the high potential voltage to deflection electrode 18. High voltage inverter 82 may include means for limiting the current produced at its output to prevent short-circuiting of deflection electrode 18 from causing the components of the inverter to become damaged due to over-current.

The output $V_D$ of inverter 82 is proportional to the level of output $V_1$ of voltage-source 78. The level of $V_1$, in turn, is determined by the setting of output voltage adjust control 80. Therefore, the setting of output voltage adjust control 80 determines the voltage potential $V_D$ applied to deflection electrode 18, provided that deflection electrode 18 is not shorted to ground potential:

A conventional voltage divider 84 is connected at one end to deflection electrode 18 and at its other end to ground potential. Voltage divider 84 samples the voltage potential $V_D$ applied to deflection electrode 18 and produces a sample voltage $V_s$ the level of which is a predetermined fraction of $V_D$. The sample voltage $V_s$ produced by voltage divider 84 is applied as one input of voltage-source 78 to cause accurate voltage regulation of high voltage potential $V_D$ (e.g. voltage control is accomplished by a conventional feedback arrangement in a well known manner). Sample voltage $V_s$ may also be applied to a conventional voltmeter 88, which may to provide an instantaneous visual indication of the level of voltage applied to deflection electrode 18.

Sample voltage $V_s$ is also applied to one input of a conventional voltage comparator 86. A reference voltage $V_{ref}$ (which may be proportional to $V_1$ and be derived from voltage-source 78) is applied to the other input of comparator 86 (of course, $V_{ref}$ could be produced in any conventional manner, such as by an independent stable voltage source).

Comparator 86 produces a TTL logic level "1" output signal $V_{sense}$ 1 whenever $V_{ref}$ exceeds the sample voltage $V_s$ produced by voltage divider 84 (i.e., whenever $V_{ref} > V_s$). Because $V_{ref}$ is derived from voltage-source 78 in the preferred embodiment, signal $V_{sense}$ 1 is produced by comparator 86 based upon a predetermined relationship between the actual and desired levels of the potential $V_D$ applied to deflection electrode 18 (the desired level being set by output voltage adjust control 80). Comparator 86 may produce $V_{sense}$ 1 briefly following the initial generation of the deflector ENABLE signal by processor 72 and following any increase in the setting of output adjust control 80 (e.g. until $V_1$ rises to the corresponding set level and $V_D$ fully tracks $V_1$). Processor 72 is preferably programmed to ignore this brief generation of $V_{sense}$ 1, as will be explained.

When deflector electrode 18 fully or partially short-circuits to ground potential, the potential $V_D$ applied to deflection electrode 18 falls due to the current limiting action of high voltage inverter 82. If the level of $V_D$ falls below a predetermined level, the level of sample voltage $V_s$ falls below the reference level $V_{ref}$ (i.e., $V_{ref} > V_s$) and comparator 86 applies a logic level "1" signal $V_{sense}$ 1 to processor 72. Processor 72 is thus informed that the high voltage potential of deflection electrode 18 has fallen below a predetermined determined level and may take appropriate responsive action, as will be explained.

The specific threshold voltage $V_s$ at which comparator 86 begins to produce a logic level "1" signal $V_{sense}$ 1 selected by the values of voltage divider 84 and $V_{ref}$, and is preferably a level below which deflection electrode 18 cannot properly deflect droplets of fluid (taking into account a desired safety margin). Comparator 86 continues to produce logical level "1" signal $V_{sense}$ 1 until the shorting of deflection electrode 18 has been corrected and deflection electrode high potential voltage $V_D$ rises to the level set by output voltage adjust control 80.

Charge electrode circuit 76 in the preferred embodiment includes a charge voltage source 90, a print pulse shaper/amplifier 92, a buffer 94, a voltage comparator 96, a charge distributor 98 and charge electrodes 16. Charge voltage source 90 produces a charge voltage $V_c$ of a predetermined level and applies this voltage to print pulse shaper/amplifier 92. Pulse shaper/amplifier 92 shapes, amplifies and buffers TTL-level print control pulses $V_P$ produced by processor 72, and applies the processed print control pulses to the input of buffer 94 and to a first input of voltage comparator 96. Buffer 94 in the preferred embodiment is a conventional unity-gain driver amplifier which produces sufficient current to drive several of charge electrodes 16. Buffer 94 may include conventional current limiting circuitry to protect charge electrode circuit 76 from failure in the event charge electrodes 16 short circuit to ground potential.

The output $V_B$ of buffer 94 is applied to a charge distributor 98 which may distribute $V_B$ to a selected plurality of charge electrodes 16 in a conventional fashion. $V_B$ (the output of buffer 94) is also applied to a second input of voltage comparator 96. Comparator 96 monitors changes in the difference between the level of signal $V_P$ applied to the input of buffer 94 and the level of signal $V_B$ produced at the input of the buffer. When a short circuit occurs between any of charge electrodes 16 and ground potential (or between active and inactive ones of the charge electrodes), the current produced by buffer 94 rises until it reaches a current limiting level, and then levels off to a safe level. At this time, the level of the output $V_B$ of buffer 94 is no longer proportional to the level of the input $V_P$ of the buffer. Voltage comparator 96 produces a logic level 1 output signal $V_{sense}$ 2 whenever the level of the output $V_B$ of buffer 94 falls below the level of the input $V_P$ of the buffer (i.e., whenever $V_B < V_P$) (of course, comparator 96 could compare the output $V_B$ of buffer 94 to a stable reference voltage level if desired).

A buffer 94, comparator 96 and charge distributor 98 may be provided for each of a plurality of different (e.g. one-inch long) sections of charge electrodes 16 (all of buffers 94 may be driven in common by pulse shaper/amplifier 92). Thus, the output of a particular one of a plurality of comparators 96 may provide an indication of which section of charge electrodes 16 is shorted or has otherwise malfunctioned.

Processor 72 may preferably comprise any conventional microprocessor or microcomputer including a central processing unit, a non-volatile program store, one or more internal registers, input/output ports etc. Processor 72 is connected to receive $V_{sense}$ 1, $V_{sense}$ 2 and a signal produced by a protection override switch 100. Protection override switch 100 may produce a logic level "1" signal whenever no short circuit protection is desired, and may produce a logic level "0" signal otherwise. Processor 72 may selectively produce an ALARM OUT signal to actuate a conventional audio and/or visual alarm 102, and also selectively applies an actuating signal $V_{catch}$ to air source 68 to control the position of auxiliary droplet catcher 25. Processor 72 also applies a deflector ENABLE signal to voltage-source 78 to actuate deflection electrode 18 (thereby causing charged fluid droplets to be deflected from path 14 into primary droplet catching structure 20). Additionally, processor 72 may selectively apply a print control signal to shaper/amplifier 92 to cause a charging signal to be selectively applied to ones of charge electrodes 16 (thereby determining which droplets are to be deflected by deflection electrode 18). The deflector ENABLE and print control signals may be produced by processor 72 in accordance with predetermined program instructions, user commands and/or appropriate pattern data supplied from a pattern control circuit (not shown), and may control the printing of material 22 in a conventional manner.

Figure 5A:
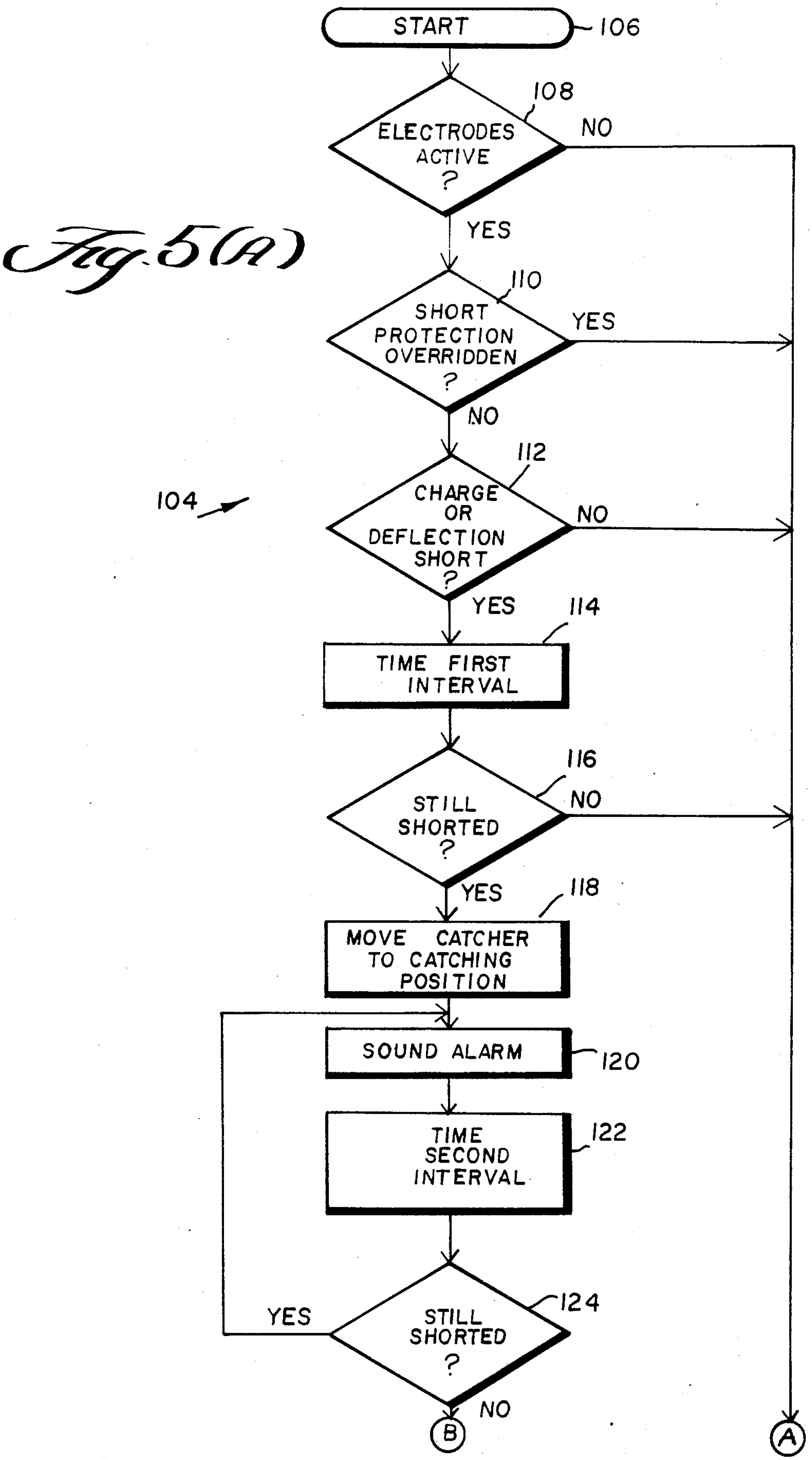
Figure 5B:
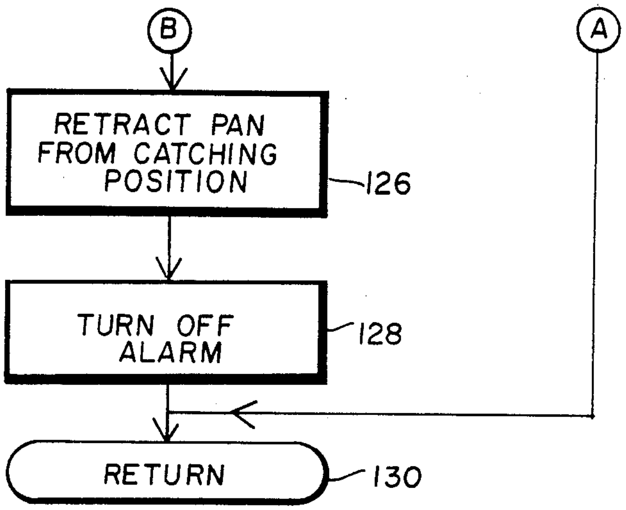

FIGS. 5(A) and 5(B) together represent a flow chart or an exemplary interrupt handler 104 stored in the internal program store of processor 72. Interrupt handler 104 is preferably executed at periodic intervals by processor 72, and begins execution at a START block 106. The flow of interrupt handler 104 as shown in the FIGS. 5(A) and 5(B) is generally from top to bottom.

Decision block 108 determines whether deflection electrode 18 and charge electrodes 16 are active by testing whether processor 72 is presently applying a deflector ENABLE signal to deflection electrode circuit 74 or a print control pulse to charge electrode circuit 76. If deflection and charging voltages are not being applied to deflection electrode 18 and charge electrode 16, respectively, interrupt handler 104 returns control to other, conventional tasks to be performed by processor 72 ("return" block 130). Of course, if only deflection voltage $V_D$ (but not charge voltage $V_B$) is being produced, interrupt handler 104 may proceed to test for shorting of deflection electrode 18 if desired.

Decision block 110 determines whether protection override switch 100 is in a position indicating that no short-circuit protection is desired. If no short-circuit protection is desired, interrupt handler 104 jumps to "return" block 130. Otherwise, processor 72 determines if either of $V_{sense}$ 1 and $V_{sense}$ 2 have a logic level "1" value (indicating that one or both of the voltages applied to deflection electrode 18 or charge electrodes 16 is below a predetermined level).

If neither of $V_{sense}$ 1 and $V_{sense}$ 2 is at logic level "1" (i.e., the Boolean expression $V_{sense}$ 1 OR $V_{sense}$ 2 is "False"), both of charging electrodes 16 and deflection electrode functioning properly, and interrupt handler 104 returns control to other tasks to be performed by processor 72 ("return" block 130). If, however, one or both of $V_{sense}$ 1 and $V_{sense}$ 2 have a logic level "1" value (i.e., the expression $V_{sense}$ 1 OR $V_{sense}$ 2 is "true"), a conventional timer (preferably a software or hardware timer internal to processor 72) begins timing a first predetermined time interval (e.g. 5 seconds) (block 114). The first time interval preferably is programmable by a user (via, e.g. a keyboard not shown) to any desired value in a conventional manner.

If neither $V_{sense}$ 1 nor $V_{sense}$ 2 is at logic level "1" at the conclusion of the first time interval (i.e. if the expression $V_{sense}$ 1 OR $V_{sense}$ 2 is "False"), deflection electrode 18 and charge electrodes 16 are no longer shorted. Interrupt handler 104 in the preferred embodiment takes no further action at this time than to release control back to other tasks to be performed by processor 72 ("return" block 130). If, however, at least one of $V_{sense}$ 11 and $V_{sense}$ 2 is still at logic level "1" at the conclusion of the first time interval (i.e., the expression $V_{sense}$ 1 OR $V_{sense}$ 2 is still "true"), either one or both of deflection electrode circuit 74 and charge electrode circuit 76 are still unable to operate properly and this inability has presumably existed for the duration of the first time interval. In order to prevent further wasting of printing fluid and print medium 22, auxiliary droplet catcher 25 is moved into its catching position (as previously described) by applying an appropriate control signal $V_{catch}$ to air source 68 (block 118). Alarm 102 is actuated when processor 72 produces the ALARM OUT signal (block 120), and other action may also be taken if desired (e.g. processor 72 may stop the printing process entirely, stop the travel of print medium 22, cause an automated electrode cleaning device not shown to begin operating, etc.).

After processor 72 actuates alarm 120, it begins timing a second programmable time interval (block 122). At the conclusion of the second time interval (which may be, for example, five seconds in duration), processor 72 once again polls $V_{sense}$ 1 and $V_{sense}$ 2 to determine whether either of deflection electrode 18 and charge electrodes 16 is still shorted (i.e., the expression $V_{sense}$ 1 OR $V_{sense}$ 2 is still "true") (decision block 124). If one or both of deflection electrode and charge electrodes 16 are still shorted, interrupt handler 104 causes processor 72 to jump back to block 120 to continue to actuate alarm 102 and to once again time the second time interval. The loop formed by blocks 120, 122 and 124 is continually executed until either controlled 70 is powered off or neither of the electrodes is shorted (i.e., the expression $V_{sense}$ 1 OR $V_{sense}$ 2 becomes "false"). Once both of deflection electrode 18 and charge electrodes 16 are once again operating properly for the duration of the second time interval (indicated when the expression $V_{sense}$ 1 OR $V_{sense}$ 2 is "false" at the conclusion of the second line interval), the level of control signal $V_{catch}$ applied to air source 68 is changed appropriately to cause cylinder 62 to retract auxiliary droplet catcher 25 into its retracted position (block 126). Alarm 102 is also turned off at this time (block 128).

While interrupt handler 104 has been described as sequentially performing all of its steps once it is invoked, it will be understood by those skilled in the art that the interrupt handler preferably is executed concurrently with other software which controls the printing process. Processor 72 could, of course, be a processor dedicated to detecting a malfunction of deflection electrode circuit 74 and charge electrode circuit 76. Alternatively, interrupt handler 104 could be made reentrant so that processor 72 could perform other tasks during the timing of the first time interval (block 114) and the second time interval (block 122). If desired, processor 72 could poll $V_{sense}$ 1 and $V_{sense}$ 2 periodically during the timing of the first and second time intervals and could determine the results of decision blocks 116 and 124 on the basis of whether a condition had existed for the entire duration of the time interval (or for at least a predetermined portion of the timed interval). Moreover, while a digital signal microprocessor is used in the preferred embodiment, any other circuit configuration (e.g. an analog processor, a discrete logic element sequential machine, etc.) could be used instead.

While the preferred embodiment uses direct voltage sensing to test whether deflection electrode 18 and charge electrodes 16 are shorted, it will be understood that other ways to detect short circuits could be used instead (for example, sensing whether excessive current is flowing to the electrodes, sensing the temperature of current carrying components, etc.) Moreover, auxiliary droplet catcher 25 could also be moved to its catching position in response to malfunctions other than inadequate voltage being applied to an electrode. For instance, it might be desirable to also move auxiliary droplet catcher 25 to its catching position upon start-up and shutdown of apparatus 10, in response to inadequate pressure or excessive flow rate of printing fluid at the orifice plate, in response to problems in the delivery or travel of print medium 22, etc.

While the present invention has been described in what is presently conceived to be a preferred exemplary embodiment, those skilled in the art may recognize that many modifications may be made which modifications shall be accorded the broadest scope of the appended claims so as to encompass all equivalent methods, assemblies and/or structures.

What is claimed is:

1. A fluid jet printing apparatus for the printing of fluid droplets onto a print medium comprising:

means for generating plural streams of droplets along a normal droplet flight path to be deposited upon said print medium;

electrostatic means for electrostatically deflecting selected ones of said droplets from said normal flight path into a deflected flight path, said droplets in said deflected flight path not being deposited onto said print medium;

sensing means for sensing an inability of said electrostatic means to deflect said selected ones of said droplets; and auxiliary droplet catching means for intercepting substantially all of said droplets along said normal flight path in response to said sensed inability.

2. Apparatus as in claim 1, wherein said auxiliary droplet catching means includes:

a receptacle reciprocally movable between at least (a) a retracted position wherein said droplets are permitted to proceed along said normal flight path to be deposited on said printed medium and (b) a catching position wherein said receptacle intercepts substantially all of said droplets proceeding along said normal flight path; and actuating means responsive to said sensed inability for selectively moving said receptacle between said retracted position and said catching position.

3. In an ink jet printing apparatus providing ink droplets along a path, charging means to electrically charge selected ones of said droplets, deflection means to generate an electrical field to deflect said selected ones of said droplets from said path, and primary droplet catching means to catch said deflected ones of said droplets, uncharged ones of said droplets thereby proceeding along said path to be deposited onto a print medium, the improvement comprising:

an auxiliary droplet catcher;

mounting means to mount said auxiliary droplet catcher between said primary droplet catching means and said print medium for reciprocal movements in a direction substantially normal to said path, between (a) a retracted position wherein droplets are permitted to proceed towards said print medium along said path and (b) a catching position wherein said auxiliary droplet catcher intercepts substantially all said droplets proceeding along said path; and control means operatively connected to said mounting means for sensing an inability of said charging means and/or said deflection means to charge and/or deflect said selected ones of said droplets and for automatically moving said auxiliary droplet catcher from said retracted position into said catching position in response to the sensed inability of said charging and/or deflection means.

4. A fluid jet printing apparatus for the printing of fluid droplets onto a print medium comprising:

printhead means for generating a stream of plural droplets along a normal droplet flight path to be deposited upon said print medium;

charge and deflection means for electrically charging selected ones of said droplets and for deflecting said selected ones from said normal flight path and into a deflected flight path, uncharged ones of said droplets thereby proceeding along said normal flight path to be deposited upon said print medium;

primary droplet catcher means disposed in said deflected flight path for catching said deflected selected ones to thereby prevent said deflected selected ones from being deposited upon said print medium;

an auxiliary droplet catcher mounted for reciprocal rectilinear movement between (a) a retracted position wherein said droplets are permitted to proceed along said normal flight path to be deposited onto said print medium, and (b) a catching position wherein said auxiliary droplet catcher intercepts substantially all said droplets along said normal flight path; and control means operatively connected to said charge and deflection means and said auxiliary droplet catcher for sensing an inability of said charge and deflection means to either charge or deflect said selected ones and for moving said auxiliary droplet catcher into said catching position in response to the sensed inability of said charge and deflection means.

5. Apparatus as in claim 4 wherein said control means also senses restored ability of said charge and deflection means and moves said auxiliary droplet catcher from said catching position to said retracted position in response to said sensed restored ability.

6. Apparatus as in claim 4 wherein said auxiliary droplet catcher includes:

tray means defining an interior cavity for accepting a volume of said droplets when said auxiliary catcher is moved into said catching position; and level maintaining means in fluid communication with said cavity for withdrawing selected volumes of said fluid in said cavity to maintain a predetermined level in said cavity.

7. Apparatus as in claim 6 wherein said level maintaining means includes means for defining a fluid withdrawal path in fluid communication with said cavity, and vacuum source means connected to said fluid withdrawal path for withdrawing fluid from said cavity.

8. Apparatus as in claim 7 wherein said fluid withdrawal path includes means for defining a beveled fluid entrance to aid in maintaining a predetermined fluid level in said cavity.

9. Apparatus as in claim 6 wherein said tray means includes a front wall forwardly angularly oriented in the direction of said normal droplet flight path, said front wall intercepting substantially all said droplets when said auxiliary droplet catcher is in said catching position such that said intercepted droplets angularly impinge upon an interior surface of said front wall.

10. Apparatus as in claim 4 further comprising mounting means for mounting said auxiliary droplet catcher for said reciprocal rectilinear movement between said retracted and catching positions.

11. Apparatus as in claim 10 wherein said mounting means includes an opposing pair of separated guide posts and collar means fixed to opposing sides of said auxiliary droplet catcher for respective sliding attachment to said pair of guide posts.

12. Apparatus as in claim 11 wherein said mounting means includes air cylinder means operatively connected to said control means and fixed to said auxiliary droplet catcher for moving said auxiliary droplet catcher into said catching position in response to said sensed inability of said charge and deflection means.

13. Apparatus as in claim 4 wherein:

(a) said charge and deflection means includes:

charging electrode means for electrically charging said selected ones of said droplets, and deflecting electrode means for deflecting said charged ones of said droplets; and wherein (b) said control means includes first sensing means for producing a first signal whenever the electric potential of said charging electrode means falls below a first predetermined level, second sensing means for producing a second signal whenever the electric potential of said deflecting electrode means falls below a second predetermined level, and means for moving said auxiliary droplet catcher into said catching position in response to any of said first and second signals.

14. Apparatus as in claims 13 wherein:

said control means further includes electronic processing means for producing an output signal in response to either of said first and second signals; and said moving means includes electromechanical actuating means for moving said auxiliary droplet catcher into said catching position in response to said output signal and for retracting said auxiliary droplet catcher into said retracted position in response to the absence of said output signal.

15. Apparatus as in claim 14 wherein said processing means produces said output signal only after at least one of said first and second signals is present for at least a first predetermined period of time.

16. Apparatus as in claim 15 wherein said processing means ceases to produce said output signal only after neither of said first and second signals are present for at least a second predetermined period of time.

17. Apparatus as in claim 14 wherein said processing means ceases to produce said output signal only after neither of said first and second signals are present for at least a second predetermined period of time.

18. Apparatus as in claim 13 wherein said first sensing means produces a plurality of said first signals, one for each of a plurality of shorted sections of said charge electrode means.

19. A method for printing fluid droplets onto a print medium comprising the steps of:

generating plural streams of droplets along a normal droplet flight path to be deposited upon said print medium;

electrically charging selected ones of said droplets with a charging electrode;

deflecting charged ones of said droplets with a deflection electrode from said normal flight path and into a deflected flight path, uncharged ones of said droplets proceeding along said normal flight path to be deposited upon said print medium;

catching ones of said droplets in said deflected flight path to thereby prevent said deflected ones from being deposited upon said print medium;

sensing an inability of at least one of said charging electrode and said deflecting electrode to charge or deflect said selected ones of said droplets, respectively; and intercepting substantially all of said droplets along said normal flight path in response to said sensed inability.

20. A method as in claim 19 wherein said intercepting step includes the step of moving an auxiliary droplet catcher into a catching position in response to the sensed inability, said auxiliary droplet catcher intercepting substantially all of said droplets along said normal flight path when in said catching position.

21. A method as in claim 20 further including the steps of accepting a volume of said droplets into said auxiliary catcher when said auxiliary droplet catcher is moved into said catching position; and withdrawing selected volumes of said fluid from said auxiliary droplet catcher to maintain a predetermined level of fluid in said auxiliary catcher.

22. A method as in claim 20 further including the steps of:

sensing restored ability of said charging and deflecting electrodes to charge or deflect said selected ones of said droplets, respectively; and moving said auxiliary droplet catcher from said catching position into a retracted position wherein said droplets are permitted to proceed along said normal flight path to be deposited onto said print medium in response to said sensed restored ability.

23. A method as in claim 22 wherein said sensing step includes:

producing a first sense signal whenever the potential of said charging electrode falls below a first predetermined level; and producing a second sense signal whenever the potential of said deflection electrode falls below a second predetermined level.

24. A method as in claim 23 wherein said moving step includes;

producing an output signal in response to any of said first and second sense signals;

moving said auxiliary droplet catcher into said catching position in response to said output signal; and retracting said auxiliary droplet catcher into said retracted position in response to the cessation of said output signal.

25. A method as in claim 24 wherein said output signal producing step includes the steps of timing a first predetermined interval in response to the presence of said first and/or second signals; and producing, subsequent to said first interval timing step, said output signal only if at least one of said first and second signals is still present.

26. A method as in claim 25 wherein said output signal producing step further includes the steps of:

timing, subsequent to said output signal producing step, a second interval of time in response to the absence of both of said first and second signals; and ceasing, subsequent to said second interval timing step, to produce said output signal only if neither of said first and second signals are still present.

* * * * *